W. M. WHITE.
APPARATUS FOR REGAINING HEAD.
APPLICATION FILED DEC. 22, 1913.
1,273,705.
Patented July 23, 1918.
2 SHEETS—SHEET 1.
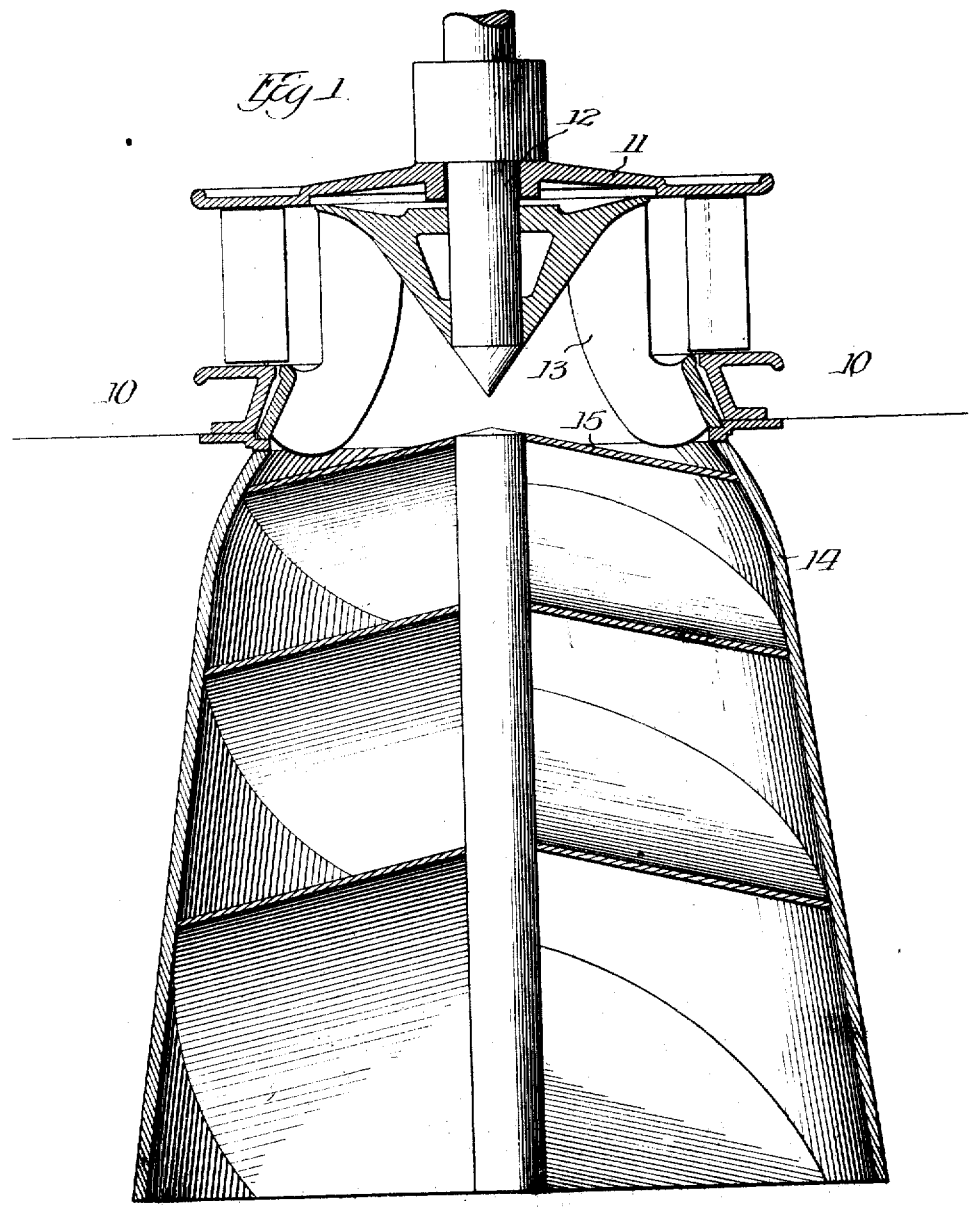

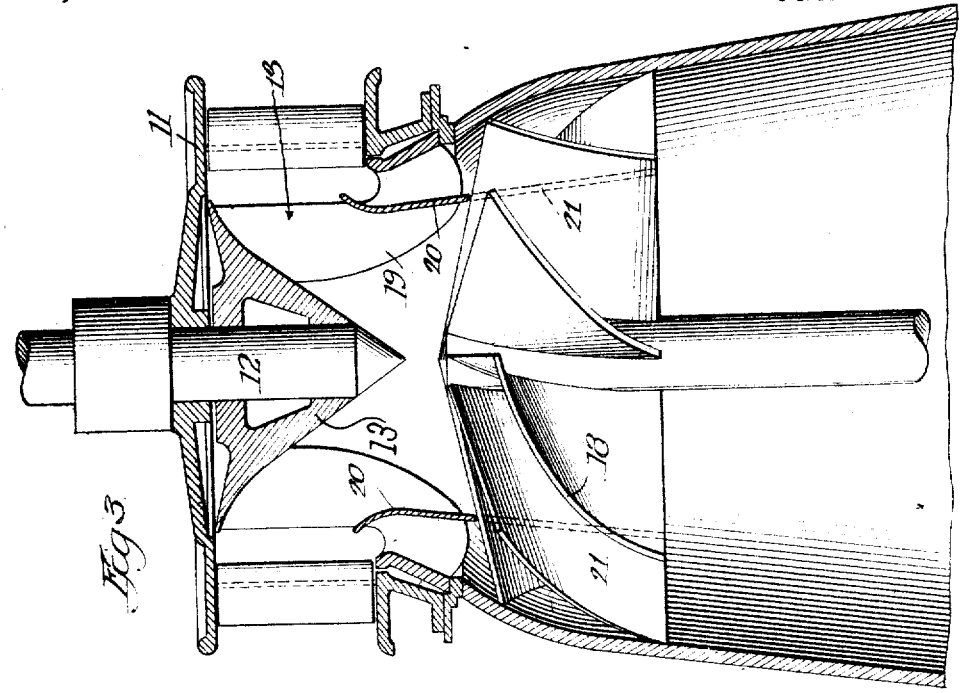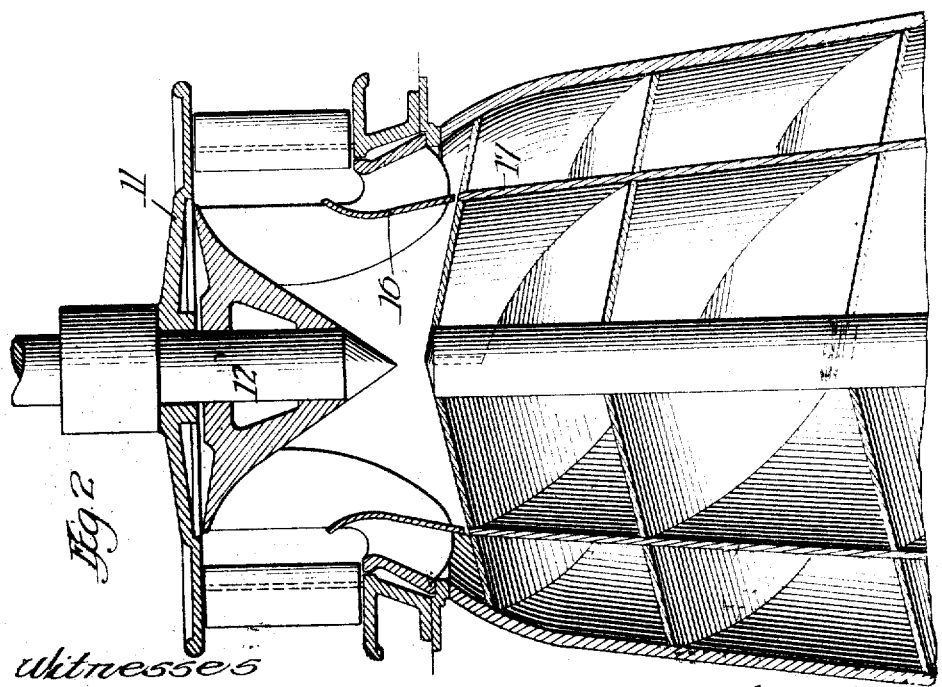

UNITED STATES PATENT OFFICE.

WILLIAM M. WHITE, OF MILWAUKEE, WISCONSIN.

APPARATUS FOR REGAINING HEAD.

1,273,705.

Specification of Letters Patent.

Patented July 23, 1918.

Application filed December 22, 1913. Serial No. 808,161.

*To all whom it may concern:*

Be it known that I, WILLIAM M. WHITE, a citizen of the United States, and resident of Milwaukee, in the county of Milwaukee and State of Wisconsin, have invented certain new and useful Improvements in Apparatus for Regaining Head, of which the following is a specification.

My invention relates to apparatus for increasing the effective head available on water wheels and has particular reference to a novel construction in which the water discharged from a water wheel is caused to move in a helical path, such path gradually becoming axial with relation to the water wheel runner. This apparatus is a modification of that disclosed in my co-pending application Serial No. 774,527.

It will be understood that under certain operating conditions the water will be discharged from a water wheel runner with a considerable tangential component. Such occasions arise when the wheel is being operated at part load or when operated at a higher speed than that for best efficiency. The water discharged therefrom would in such cases contain considerable energy in the form of velocity, this energy being exerted tangentially or angularly with relation to the axis of the wheel. In a straight flaring draft tube of the common form this energy is wasted in eddies, cross currents, etc., and is not made to perform any useful work. In the co-pending application referred to I have provided means whereby such tangential velocity may be changed into pressure thus producing an increase of effective head available on the water wheel. The present apparatus is designed to accomplish such result in a draft tube having much the same form as that which is well known, the object being to provide in such a draft tube one or more guiding vanes disposed at an angle to the line of motion of the water wheel runner in order that water discharged from the runner with angular velocity may pass into the tube or the passages formed by the guiding vanes without material change in direction and may expand in said passages as required in order to change the velocity into pressure.

It is further more desirable that these deflecting vanes may have a variable degree of curvature in order that the energy in the water may be gradually changed from angular to axial with reference to the runner without eddies or whirl. This results in a construction in which the pitch of the vanes increases from the intake to the discharge ends of the tube.

It may be found desirable to divide the runner vanes with webs thus forming two or more passages between each blade of the runner and, likewise, dividing the draft tube into similar passages by means of one or more concentric webs located between the helical deflector. By this means there is less possibility of conflicting currents being set up in the draft tube, portions of the water having different angular velocities being separated at the runner.

In some instances in order to provide a more simple and economical construction it may be found desirable to provide in the draft tube a larger number of short deflecting vanes, these vanes being set to give a general helical movement to the discharge water and to thereafter deflect the water down the draft tube in an axial line, the change from helical to axial motion being more abrupt than in the construction just described. Furthermore the divisions in the water wheel runner and deflectors may be made in this type with equal facility and with corresponding advantages accruing therefrom.

Furthermore, this point of advantage may be carried farther and a deflector placed in the supplying guide vanes, whereby the water is separated prior to entering the water wheel runner. By providing controlling means for each section of the supplying guide vanes as divided by the web referred to, the amount of water supplied to each portion of the wheel may be controlled or if desired, the wheel may be operated by water passed through only one portion of the runner. By the provision of separate draft tubes registering with separate portions of the water wheel runner and supplied from separate sources, a most exact control of the water wheel is possible.

The invention will be more readily understood by reference to the accompanying drawings, wherein:

Figure 1 is a vertical section through a typical vertical water wheel and draft tube showing the helical vanes located in the tube;

Fig. 2 is a view similar to Fig. 1, showing a modification wherein the runner is divided by means of a concentric web, the helical vanes in the draft tube being similarly divided forming passages registering with the passages in the runner;

Fig. 3 is a similar view through a further modification, in which the guide vanes in the draft tubes are shorter and more numerous than in the construction just referred to.

Referring more particularly to the drawings it will be seen that within a space 10, I mount a casing 11, carrying a shaft 12, on which is mounted a water wheel 13, of any approved form. Beneath the water wheel is located a tube 14, preferably slightly flared as well understood. Provided within the tube are a plurality of (preferably four) deflecting vanes 15, of helical form, each helix being gradually distended toward the bottom. Moreover the pitch of each helix increases from the inlet to the outlet end thereof, whereby each helical passage is of increasing cross-sectional area and of consequent increasing capacity. Thus the water which passes from the water wheel runner with a tangential component is permitted to follow a helical path in its descent of the tube, its helical path being gradually changed into axial flow without shock which would cause eddies therein. It will be understood that the number and disposition of the vanes may be varied as required; also that the angularity thereof will be varied to suit different conditions.

The present invention provides in effect passages, between the vanes 15, of gradually increasing capacity in the direction of flow and similarly to a straight axis regainer of gradually increasing capacity in the direction of flow, the velocity head of the water will be changed into pressure head to increase the effective head upon the wheel by creating a lower pressure at the discharge end of the wheel than would be obtained by a straight draft tube. My experiments show that the head is actually increased and I am confirmed in this by Merriman in his "Treatise on Hydraulics", edition 1903, on pages 186, 187 and 188. In place of the straight axis regainer which as Merriman points out increases the actual head of the water flowing through the entrance to it which in the present instance is where the wheel is located, I am providing helically inclined regaining passages, between the vanes 15, so that I may deflect the water coming tangentially from the wheel in a direction axially to the tube without the eddies and whirls attendant upon the use of the usual straight draft tube and thus increase the regaining effect.

Referring now to Fig. 2, it will be noted that the vanes of the runner are divided by means of a web 16, the lower end of which web is substantially in line with a web 17, dividing the helical vanes of the tube into concentric passages. Thus I have provided two concentric runners and draft tubes in which may be found different pressures and different reaction with t one interfering materially with the other. This permits the ends of the helices of the two sections to be set at different angles to the line of motion of the runner.

In Fig. 3 it will be noted that the helices 18, provided in the draft tube have been very much shortened and that a greater number is used forming in effect, guide vanes which catch the water as it flows from the runner with a whirling motion and change the whirling or tangential motion to axial motion within the tube. The runner 19, is divided by a concentric web 20, registering with a concentric web 21, dividing the guide vanes into two sections, forming passages registering with passages in the runner. These divisions prevent cross currents and eddies being set up in the runner and guide vanes and permit different pressure to be utilized in the runner.

The modifications herein illustrated are only typical of others which may be made by those skilled in the art and I do not wish to be limited other than by the scope of my claims to the construction herein described.

By water wheel under the present specification and claims, I mean a water wheel, hydraulic turbine or any hydraulic power producing apparatus having a runner of such form as to cause the water to be discharged from it preferably axially to the rotation of the runner and I mean especially any hydraulic power producing apparatus which may be used with my invention for the accomplishment of the results claimed. One type of a water wheel in the meaning of the specification and claims is illustrated in the drawings.

I claim:

1. In apparatus of the class described, the combination of a draft tube, and a helical deflecting vane located therein, substantially as described.

2. In apparatus of the class described, the combination of a flaring draft tube, and a helical deflecting vane located therein, substantially as described.

3. In apparatus of the class described, the combination of a draft tube, and a plurality of helical deflecting vanes located therein whereby water discharged from a water wheel runner with angular velocity may expand in a helical passage and change its velocity into pressure, substantially as described.

4. In apparatus of the class described, the combination of a draft tube, and a helical deflector located therein, the pitch of said helix being gradually increased from the inlet to the end of said helical deflector, substantially as described.

5. In apparatus of the class described, the combination of a draft tube and a helical deflector located therein, the surfaces of said helix at different points in the length of said deflector having different axial dimensions, substantially as described.

6. In water wheel construction, the combination of a runner having dividing webs, a draft tube, helical deflectors in said tube, and division walls in said tube forming passages registering with the passages through said runner, substantially as described.

7. The combination, with a water wheel and its draft tube, of means within said draft tube for causing the water to traverse a helical path of gradually increasing pitch after it leaves the runner.

8. In apparatus of the class described, the combination of a draft tube and a plurality of deflecting surfaces disposed therein, said surfaces being so disposed helically with respect to each other to cause the water to pass in a substantially helical path through said tube.

9. The combination of a water wheel having runners provided with webs to divide the wheel into sections, a draft tube communicating with the discharge end of the wheel, and means within said tube for causing the water discharged from each section of the runner to traverse a helical path.

10. The combination with a water wheel, of its draft tube provided with means for causing the water to flow in a helical path after it leaves the runner.

Signed at Chicago, Cook county, Illinois, this 18th day of December, 1913.

WILLIAM M. WHITE.

Witnesses:
CHAS. F. MURRAY,
T. D. BUTLER.